United States Patent [19]

Feeney et al.

[11] 4,172,860

[45] Oct. 30, 1979

[54] ADHESIVE COMPOSITION

[75] Inventors: George W. Feeney; Thomas G. Chambers, both of Akron; Shirley L. Church, Uniontown, all of Ohio

[73] Assignee: The Goodyear Tire & Rubber Company, Akron, Ohio

[21] Appl. No.: 947,676

[22] Filed: Oct. 2, 1978

Related U.S. Application Data

[63] Continuation of Ser. No. 692,250, Jun. 3, 1976, abandoned.

[51] Int. Cl.$^2$ .............................................. C08L 53/02
[52] U.S. Cl. .............................. 525/97; 260/33.6 AQ; 428/40; 428/355; 525/99
[58] Field of Search ................... 260/876 B, 888, 894, 260/897 A

[56] References Cited

U.S. PATENT DOCUMENTS

| | | | |
|---|---|---|---|
| 3,658,740 | 4/1972 | Marrs et al. | 260/876 B X |
| 3,880,953 | 4/1975 | Downey | 260/876 B |
| 3,949,020 | 4/1976 | Prudence | 260/879 |

OTHER PUBLICATIONS

Brewster et al., *Organic Chemistry*, 3ed, (Prentice-Hall, 1961) pp. 784–785.
Miles et al., Polymer Technology (Temple Press, 1965) p. 183.

*Primary Examiner*—Thomas DeBenedictis
*Attorney, Agent, or Firm*—H. C. Young, Jr.

[57] ABSTRACT

An adhesive composition having particular reference to solution cast and hot melt adhesives comprised of an admixture of a tackifier and an unvulcanized block polymer product produced by the process of contacting conjugated diolefinic monomers mixed with a suitable amount of divinylbenzene under solution polymerization conditions with a polystyryl lithium catalyst.

5 Claims, No Drawings

ADHESIVE COMPOSITION

This is a continuation of application Ser. No. 692,250 filed June 3, 1976 and now abandoned.

This invention relates to adhesive compositions. While the invention is not necessarily restricted thereto, it has particular reference to pressure sensitive adhesives of both the solution cast and the hot melt types. It further relates to pressure sensitive tapes.

Various adhesives can advantageously be used as pressure sensitive, laminate and hot melt adhesives. Most are generally known for their ability to form bonded laminated articles and some are more particularly known as pressure sensitive adhesives and some as hot melt adhesives.

Pressure sensitive adhesives and adhesive-coated masking tapes and the like are well known. These products commonly contain natural rubber and a thermoplastic tackifier resin compatible therewith. The adhesive, coated on a flexible backing to form a tape, is tacky at normal room temperatures and adheres instantly and tightly to surfaces against which it is pressed without requiring moistening or heating. It typically is required to have good shear strength and 180° peel strength in order to be commercially useful.

Adhesives are many times based on mixtures of rubbery materials and tackifiers. Pressure-sensitive adhesives typically require more sophisticated properties than simple tackified rubber compositions. They must have especially balanced properties of adhesion, cohesion and elasticity in addition to peel and shear strengths to be useful for adhering materials together on a pressure-sensitive basis.

Many times, pressure-sensitive adhesives can be based on mixtures of tackifiers with natural rubber or with unvulcanized block copolymers of butadiene and styrene or isoprene and styrene in order to achieve the desired properties. However, often a pressure sensitive adhesive composite of such block copolymers is deficient is necessary properties for desired purposes.

It is therefore an object of this invention to provide an adhesive composition of a tackifier and a rubbery block copolymer of styrene and butadiene or isoprene.

In accordance with this invention, it has been discovered that an adhesive composition comprises an admixture of (A) 100 parts by weight of an unvulcanized block polymer product produced by the process of contacting conjugated diolefinic monomers mixed with a suitable amount of divinylbenzene under solution polymerization conditions with a polystyryl lithium catalyst, said amount of divinylbenzene being from about 0.5/1 to about 10/1, preferably about 0.5/1 to about 3/1, moles of divinylbenzene per mole of active lithium catalyst, whereby resulting in a thermoplastic block polymer that is essentially non-gel and has the divinylbenzene coupling agent attached to the diolefinic portion of the block polymer, and (B) about 50 to about 150 parts by weight tackifier therefor.

In the practice of this invention, said tackifier is a resin preferably having a softening point in the range of about 50° C. to about 150° C., preferably about 80° C. to about 115° C. and is preferably selected from at least one of terpene resins and synthetic hydrocarbon derived resins of diolefin/olefin copolymers. Such diolefin/olefin copolymers are of the type prepared by copolymerizing in the presence of a catalyst selected from aluminum chloride or boron trifluoride or boron trifluoride etherate, piperylene and at least one olefin containing 4 to 6, preferably 5 to 6, carbon atoms in a diolefin/olefin mole ratio in the range of about 0.6/1 to about 4/1, preferably about 0.8/1 to about 2.5/1. Optionally, said copolymer can be modified by copolymerizing therewith about 5 to about 20, weight percent, based on the total monomers, of at least one additional monomer selected from α-methyl styrene and dicyclopentadiene. Some of such resins can have melting points according to ASTM E28-58T less than the required range. However, lower softening resins can be conveniently mixed with higher softening point resins to achieve the required range.

A particularly desirable type of tackifying resin is prepared from piperylene and 2-methyl-2-butene, with the optional inclusion of α-methyl styrene and/or dicyclopentadiene. Aluminum chloride would be a preferred catalyst.

In the further practice of this invention the unvulcanized elastomeric block copolymer preferably has its first polystyrene block with a molecular weight in the range of about 8,000 to about 45,000 with the overall styrene content in the copolymer being in the range of about 10 to about 35 weight percent, preferably 10 to 20 percent.

Additional description of the required block copolymer for this invention and methods for its preparation are found in U.S. Pat. No. 3,949,020 and it is herein incorporated by reference.

In the block copolymer, the molecular weight of the polystyrene block and the molecular weight of the polydiolefin block can range quite broadly. Also, the weight ratio between the polystyrene and the polydiolefin can range quite broadly. The polystyrene block molecular weight can range from about 8,000 to about 45,000. The polydiolefin block molecular weight, ignoring the effect of DVB, can range from about 10,000 to about 100,000. It should be understood that one skilled in the art could adjust these molecular weight limitations and ratios to produce a host of materials ranging from soft, relatively weak (tensile at break 500 psi) adhesive substrates, through tough thermoplastic elastomers, to plastics. Because these materials are branched, they are more easily processed than their linear counterparts.

The polystyryllithium catalysts useful in the preparation of the block copolymer are those that correspond to the formula RLi, in which R is polystyrene prepared by reacting alkyllithium with a styrene monomer solution forming polystyrene with a lithium atom at one end of the styrene chain. The alkyllithiums which can be utilized in the instant invention are n-butyllithium, secondary butyllithium, isopropyllithium, amyllithium, etc. Similarly, substituted styrenes such as p-methylstyrene, p-t-butylstyrene, or other substituted styrenes may be used in place of styrene. For instance, if a styrene-isoprene block polymer branched along the polymer chain of the polyisoprene block to other styrene-isoprene units is to be prepared, the n-butyllithium is reacted with a styrene solution to make a polystyryl lithium catalyst which can then be added to a butadiene solution containing the branching agent and polymerizing the butadiene solution until the desired block polymer is formed.

The polymerization reaction is usually carried out in an inert solvent such as a hydrocarbon. It has been found, however, that all hydrocarbons will not be particularly conducive. Some hydrocarbons that can be utilized for preparing the copolymer are benzene, toluene, cyclohexane, cyclopentane and methylcyclopentane.

The composition of this invention, comprised of the block copolymer and tackifier resin, generally suitable as an adhesive, can be conveniently prepared by mixing the block copolymer with a suitable tackifying resin in the presence of a volatile organic solvent. The mixing is usually accomplished at a temperature in the range of about 0° C. to about 100° C., and more typically from about 20° C. to about 60° C., but between the freezing point and the boiling point of the mixture. Various aliphatic and aromatic hydrocarbons can be used for this purpose. Representative of various aromatic hydrocarbons include toluene, benzene and xylene and representative of various aliphatic hydrocarbons include pentane, hexane, heptane and octane. A particularly suitable hydrocarbon solvent is a mixture of aromatic and aliphatic hydrocarbons such as, for example, a mixture of about 10 to about 90 weight percent toluene and correspondingly about 90 to about 10 weight percent hexane. Such an adhesive mixture can then suitably bond substrates together such as by simply applying it to substrate surfaces, adhering the surfaces with a thin film of the mixture therebetween, and drying the mixture. Preferably, the mixture is applied to at least one of the substrate surfaces, followed by partially drying it by evaporation to enhance its tack and bringing the substrate surfaces together with the application of pressure while the film of adhesive mixture is maintained therebetween and drying said adhesive to enhance the bond.

The composition of this invention has particular utility as a pressure-sensitive adhesive. For example, pressure-sensitive tapes can conveniently be prepared by applying the mixture comprised of a solution of the adhesive composition to a flexible substrate and drying the mixture. For this purpose, generally a thickness of the composition on the flexible substrate in the range of about 0.5 to about 2 mils is satisfactory.

The adhesive composition of this invention can also have utility as a hot melt pressure-sensitive adhesive, particularly when prepared by mixing the block copolymer, tackifying resin thermoplastic polymer such as polyethylene, polystyrene, ethylene-vinyl acetate copolymers and the like and a minor amount of an oil such as petroleum-derived or coal tar-derived oil. Particularly suitable is mineral oil or rubber processing oil. The hot melt adhesive is simply applied by heating the mixture, applying it to a substrate and cooling.

In the preparation of the adhesives of this invention it is understood that minor amounts of various antioxidant and fillers can be added and mixed therewith in order to further improve its aging characteristics and various physical properties.

The following examples further illustrate the invention and are not intended to be limiting. In these examples the parts and percentages are by weight unless otherwise indicated.

EXAMPLE I

A thermoplastic tackifying resin is prepared by the following method:

To a reactor is charged 200 parts of heptane and 6 parts of anhydrous aluminum chloride at a temperature of about 25° C. While continuously stirring the mixture, 400 parts of a hydrocarbon mixture containing unsaturated hydrocarbons is slowly added to the reactor over a period of about 90 minutes. The temperature of the reaction is thereafter maintained in a range of about 25° C. to about 30° C. for about 60 minutes. The hydrocarbon mixture has the following composition:

| Component | Percent |
| --- | --- |
| 2-pentene | 5.1 |
| 2-methyl-2-butene | 32.9 |
| Isoprene | 3.1 |
| 1,3-pentadiene(piperylene) | 27.5 |
| 2,3-dimethyl-1-butene | 2.1 |
| 4-methyl-2-pentene | 19.4 |
| Unsaturated hydrocarbons containing 5 to 6 carbon atoms | 10.5 |
| | 100.6 |

After this polymerization, 25 parts of water, 8 parts of particulate hydrated calcium hydroxide and 8 parts of Attapulgus clay are added to the polymerizate. Agitation is provided to suspend the hydrated calcium hydroxide at about 90° C. and continued for about 120 minutes. The mixture is then filtered to remove the insoluble catalyst residue, excess calcium compound and clay. The filtrate is then steam distilled to a pot temperature of about 235° C. The resulting residual molten resin is poured from the reactor onto an aluminum tray and cooled to about 25° C. to form 173 parts of a hard brittle resin having a pale yellow color, and having a softening point, according to ASTM Method E28-58T of about 94° C.

EXAMPLE II

A styrene/isoprene block copolymer is prepared according to the method of Example II of U.S. Pat. No. 3,949,020.

EXAMPLE III

Both solution cast and hot melt adhesives were successfully prepared through the mixture of a tackifying resin generally prepared according to Example I and a styrene/isoprene block copolymer prepared according to the general method of Example II exhibiting an enhanced heat stability under mixing shear and stress for the hot melt and lower solution viscosity for the solution cast adhesives with an attendant substantial increase in 180° peel adhesion.

In the practice of this invention, it is preferable that the polystyrene block has a molecular weight in the range of about 10,000 to about 25,000, based on number average, for hot melt applications.

While certain representative embodiments and details have been shown for the purpose of illustrating the invention, it will be apparent to those skilled in this art that various changes and modifications may be made therein without departing from the spirit or scope of the invention.

What is claimed is:

1. An adhesive composition comprises an admixture of (A) 100 parts by weight of an unvulcanized branched, thermoplastic block polymer product produced by the process consisting essentially of contacting a diolefin selected from the group consisting of at least one of isoprene and 1,3-butadiene pre-mixed with a suitable amount of divinylbenzene, under solution polymerization conditions with a polystyryl lithium catalyst, said amount of divinylbenzene being from about 0.5/1 to about 10/1 moles of divinylbenzene per mole of active lithium catalyst to form said thermoplastic block polymer that is essentially non-gel and has the divinylbenzene coupling agent attached to the diolefinic portion of the block polymer, and (B) about 50 to about 150 parts by weight tackifier therefor; where said tackifier is a resin having a softening point in the range of about 50° C. to about 150° C. and is selected from at least one of terpene resins and synthetic hydrocarbon resins derived essentially as diolefin/olefin copolymers prepared by polymerizing the monomers in the presence of a catalyst selected from aluminum chloride or boron trifluoride or boron trifluoride etherate; and where, in said block copolymer, the polystyrene block molecular weight is in the range of about 8,000 to about 45,000, the polydiolefin block has a molecular weight in the range of about 10,000 to about 100,000, ignoring the DVB effect, with the overall styrene content in the block copolymer being in the range of 10 to 35 weight percent.

2. The adhesive composition of claim 1 where said tackifier is a resin prepared by polymerizing piperylene and at least one olefin containing 4 to 6 carbon atoms in a diolefin/olefin mole ratio in the range of about 0.6/1 to about 4/1.

3. The adhesive composition of claim 2 where said tackifier is a resin prepared by polymerizing piperylene and at least one olefin containing 5 to 6 carbon atoms in a diolefin/olefin mole ratio in the range of about 0.8/1 to about 2.5/1 and is optionally modified by copolymerizing therewith about 5 to about 20, weight percent based on the total monomers, of at least one additional monomer selected from α-methyl styrene and dicyclopentadiene.

4. The adhesive composition of claim 3 where said tackifier is a resin prepared by polymerizing in the presence of aluminum chloride, piperylene and at least one olefin comprised primarily of 2-methyl-2-butene.

5. The adhesive composition of claim 1 as a solution cast pressure sensitive adhesive.

* * * * *